June 8, 1954
J. D. CATON
2,680,475
SPRING SEAT CONSTRUCTION
Filed June 3, 1950
2 Sheets-Sheet 1
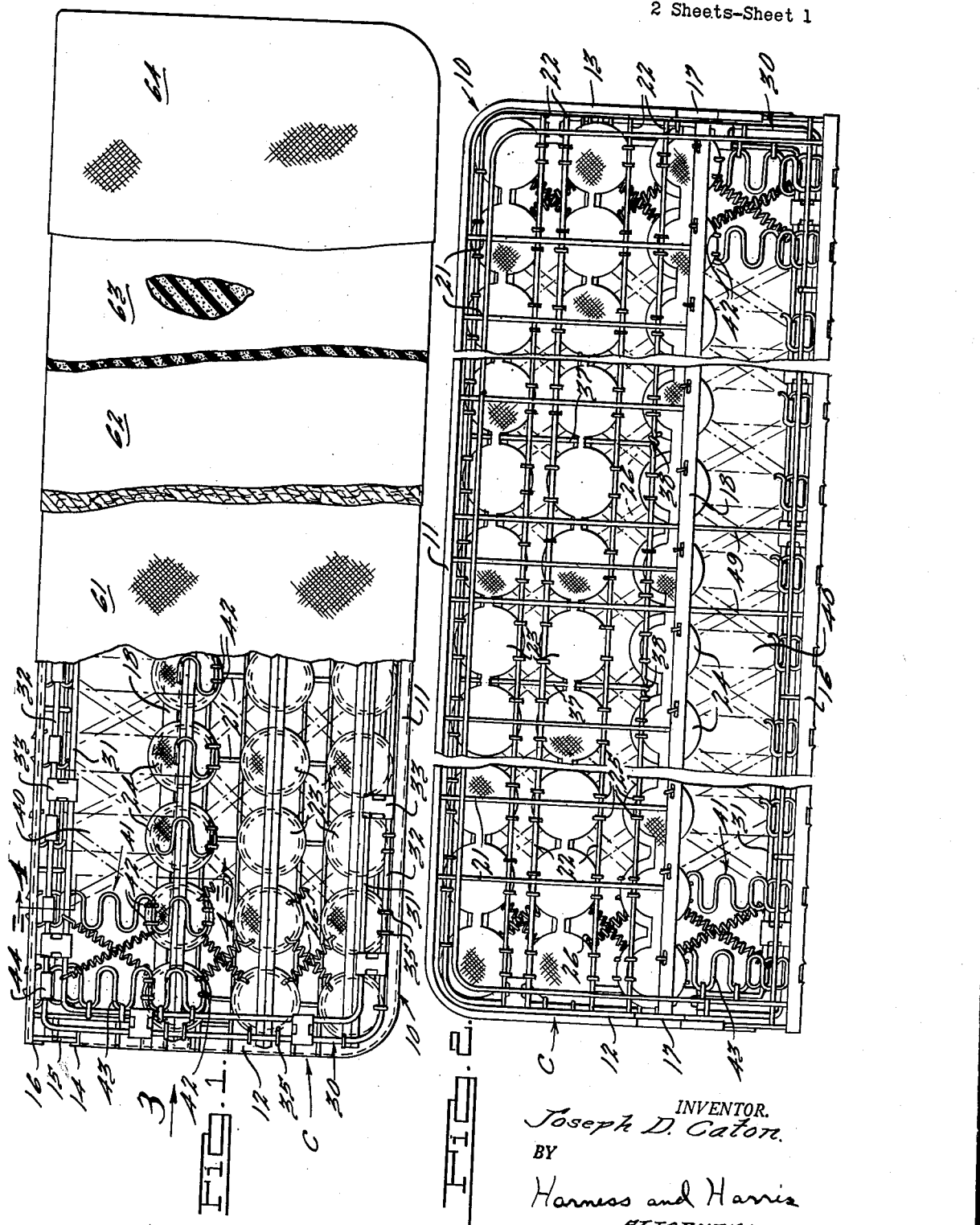
INVENTOR.
Joseph D. Caton.
BY
Harness and Harris
ATTORNEYS.

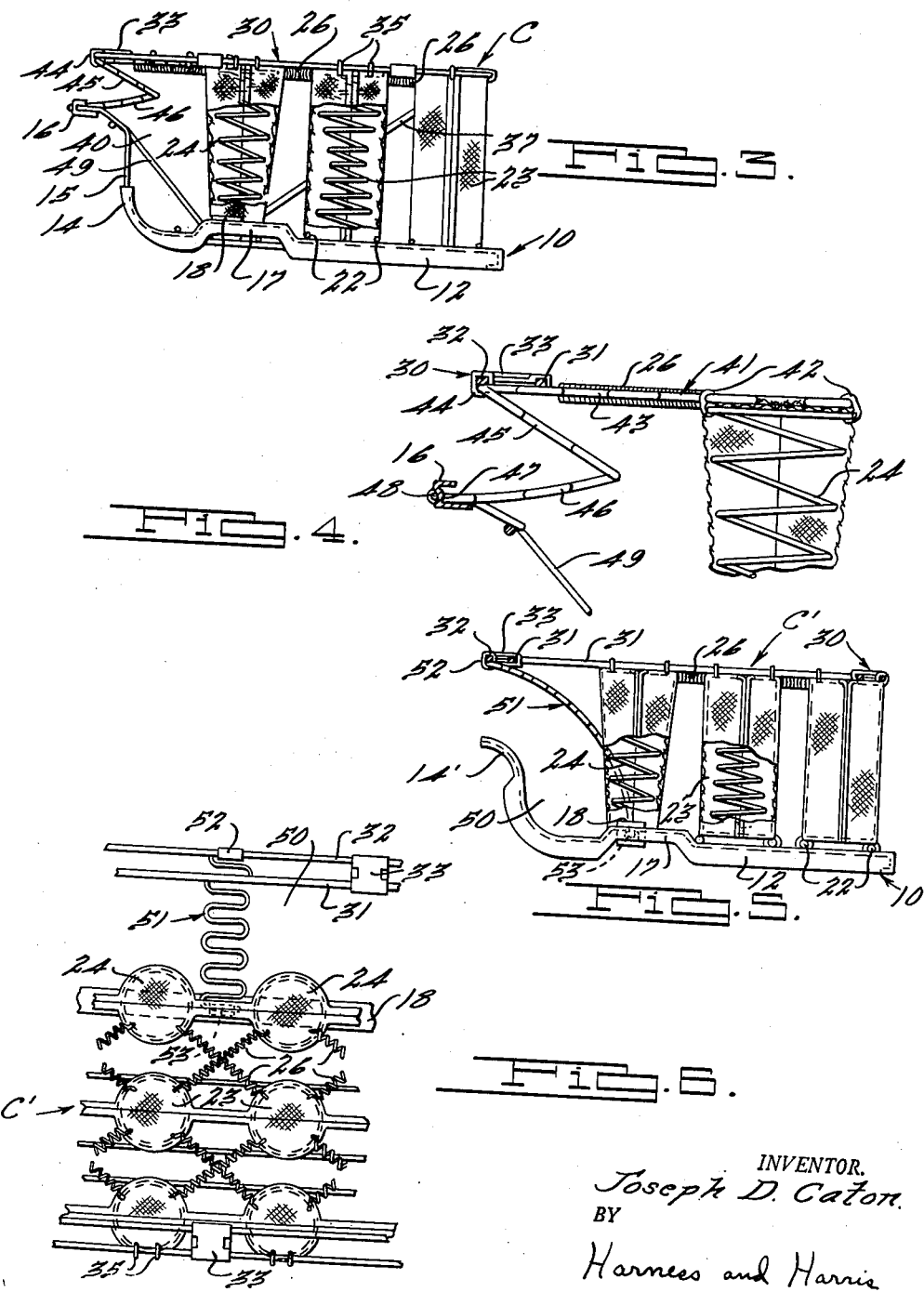

Patented June 8, 1954

2,680,475

UNITED STATES PATENT OFFICE 2,680,475

SPRING SEAT CONSTRUCTION

Joseph D. Caton, Detroit, Mich., assignor to Chrysler Corporation, Highland Park, Mich., a corporation of Delaware Application June 3, 1950, Serial No. 165,938

27 Claims. (Cl. 155—179)

This invention relates to spring cushion structures and particularly to a cushion structure intended for use in the front or forwardly disposed seat of a multiple seat motor vehicle or the like.

It has been found to be quite advantageous to design motor vehicles such that the passengers are given a "cradled" ride, that is with the several front and rear seat units located between the front and rear wheel axles or spindles. As a result of this type of chassis frame and body design, the rear seat unit is located somewhat closer to the front seat unit than would otherwise be the case provided the wheelbase of the vehicle is not changed. Accordingly, appropriate steps must be taken to increase the toe and leg room in the rear compartment of the vehicle so as to maintain the desired leg room and passenger comfort in the rear compartment. This invention relates to a front seat spring cushion construction that provides additional toe and leg room for the passengers in the rear seat or a rearwardly disposed seat of a motor vehicle or the like.

It is the primary object of this invention to provide a spring cushion adapted for use in the front or forwardly disposed seat of a motor vehicle or the like that will increase the available toe and leg room of the passengers located in the seat unit rearwardly thereof.

It is a further object of this invention to provide a spring cushion construction that has a reduced effective height along certain portions thereof which portions, however, still provide the required resilient support.

It is another object of this invention to provide a spring cushion construction that permits elimination of certain relatively costly spring elements and the substitution therefor of less costly spring elements without a material reduction in the resilient supporting properties of the cushion in the altered or other areas of the cushion.

It is another object of this invention to provide a spring cushion construction that includes a recessed opening along an edge thereof adapted to receive the passengers feet.

Other objects and advantages of this invention will be readily apparent from a reading of the attached description and a consideration of the related drawings wherein:

Fig. 1 is a top plan view of a seat cushion embodying this invention with portions thereof broken away to more clearly disclose the novel construction;

Fig. 2 is a bottom plan view of the cushion unit shown in Fig. 1 but drawn to a slightly reduced scale;

Fig. 3 is a fragmentary end elevation of the cushion disclosing the construction at the rear side thereof, the view being taken looking in the direction of the arrow 3 in Fig. 1;

Fig. 4 is an enlarged, fragmentary, sectional, elevational view taken along the line 4—4 of Fig. 1 disclosing among other things the arrangement of the flat, sinuously shaped, spring strips in the cushion unit;

Fig. 5 is a fragmentary end elevational view of a modified form of this invention; and Fig. 6 is a fragmentary top plan view of the modified cushion construction shown in Fig. 5.

The spring cushion C, disclosed in Figs. 1-4 of the drawings, includes a channel type lower border frame 10 of substantially U-shaped plan configuration. Frame 10 includes the forward side element 11 and the end frame elements 12 and 13. End frame elements 12 and 13 have their rearwardly disposed free ends bent upwardly, as indicated at 14, to provide supports for the legs 15 of the rear, intermediately disposed, border frame member 16 (see Fig. 3). The end frame elements 12, 13 may be formed with indented portions 17 adapted to be engaged with mating formations on the cushion supporting framework to provide a means for anchoring the cushion in place. Extending between the end frame elements 12 and 13 and connected thereto at the regions of the indentations 17, so as to be spaced forwardly of the rear side of the cushion C, is a rear side lower border frame element 18. Frame element 18 coacts with frame elements 11, 12 and 13 to provide the substantially rectangular lower border frame 10. Connected between the front and rear lower border frame elements 11 and 18 are a number of spaced apart brace rods 21. Connected between the end frame elements 12 and 13 of the lower border frame 10 and supported on the braces 21 are a number of spaced apart, parallel, coil spring supporting rods or wires 22 that also serve as lower border frame brace wires. Mounted on the spaced apart supporting wires 22 are a plurality of fabric encased coil spring elements 23 and 24. Coil springs 23 are of the hour-glass or cylindrical type whereas springs 24 are preferably of the inverted cone type. The reasons for the use of the inverted cone-type springs along the rear portion of the cushion unit will subsequently become quite apparent. Springs 23 and 24 have the lower coils thereof connected to the support wires 22 by conventional hog rings or the like 25. The upper coils of the springs 23 and 24 are connected together by the criss-cross arranged, helical, spring connections 26.

Supported on the top coils of the border springs of the cushion unit C is a rectangularly shaped upper border frame 30. Upper border frame 30 comprises inner and outer spaced apart wires or rods 31 and 32 that are connected together by the plate-like clips 33. Upper border frame 30 has the wire members 31 and 32 thereof connected to the upper coils of the border springs 23 and 24 by hog rings 35 or the like.

Pivotally connected between the most rearwardly disposed, lower frame, spring supporting wire or rod 22 and the front or forward side of the upper border frame 30 are a pair of pivot arms 37. Arms 37 act as pivot links to stabilize the movement of the upper border frame 30. The lower ends of rods 37 are wrapped around the associated lower spring supporting wire 22 in a manner that provides a relatively inexpensive pivot connection. This pivot connection is shown at 38. A similar type of connection may be used at the upper ends of arms 37 to connect the arms 37 to the upper border frame 30.

It will be noted from Fig. 1–3, that the cone type coil springs 24 are located considerably forward of the rear edge of the cushion unit C. This provides an unoccupied space or opening 40 at the rear of cushion C that is specifically adapted to provide room for the feet of the occupant of the seat unit that is located rearwardly of the cushion unit C. It is obvious that the portion of the seating surface of cushion C above the space 40 must be constructed in a manner that provides an adequate resilient support for the loads applied thereto and this is accomplished by the particular construction herein disclosed.

Mounted on each of the top coils of the coil springs 24, so as to extend rearwardly therefrom, is a flat, sinuously shaped spring strip 41. The forwardly projecting end of each spring strip 41 is connected to the upper coil of a spring 24 by the hog rings 42. It will be noted that the spring strips 41 extend completely across the upper coils of the springs 24 and have a pair of spaced straight legs thereof connected to diametrically opposite portions of the upper coils of the springs 24 by the hog rings 42. This gives a firm support for the forward end of the spring strips 41. Each strip 41 has a relatively flat portion 43 that extends rearwardly to the rear side of the top border frame 30. The straight leg of the spring strip portion 43 that is located beneath the outer wire 32 of the rear side of border frame 30 is connected to the superimposed border frame wire 32 by a plate-type clip 44. The portion of strip 41 projecting beyond or from the clip connected rear end portion of the flat portion 43 is formed as a so-called "fish-mouth" or V-shaped hinging section composed of the forwardly converging hinge leg portions 45 and 46 respectively. The free, rearwardly disposed, end 48 of hinge leg portion 46 is pivotally connected to the channel-shaped, rearwardly disposed, intermediately arranged, border frame member 16. The connection of the free end 48 of hinge leg portion 46 to the intermediately disposed border frame element 16 is clearly shown in Fig. 4. It will be seen from Fig. 4 that a number of pivot pin receiving portions 47 are punched out of the border frame member 16 and the free ends 48 of the spring strip hinge portions 46 are merely inserted through the pivot pin openings 47 formed in the channel member 16 and anchored therein by bending the tips of the spring strip pivot pin ends 48 outwardly. This method of connecting sinuously shaped spring strips to border frames is well known in the art and therefore it is not thought that it needs further description.

The opposite ends of the, intermediate, rear border frame member 16 are held in the position intermediate the frames 19 and 30 by the support legs 15 that are carried by the upturned ends 14 of the lower border frame members 12 and 13. To provide additional support for the intermediate border frame member 16, a pair of brace struts or wires 49, positioned centrally of the length of the cushion C, may be rigidly connected between the intermediate border frame member 16 and the lower border frame 10. These wires or struts 49 are located in the space 40 at the rear of the cushion unit but they occupy such a little space that the space 40 is practically unobstructed for the full length of the cushion C.

It is thought that the above description of this invention clearly brings out that a cushion unit having excellent load supporting characteristics has been provided which unit also provides a recess or space 40 along the rear side thereof to receive the feet and portions of the legs of the person located rearwardly of the cushion C. The coil springs 23 and 24 are located at the points where the majority of the load is to be supported so as to insure the maximum in resilient load support. The fish-mouthed spring hinging strips 41, located above the space 40 at the rear side of the cushion C, provide the necessary resilience for the rear portion of the load supporting surface while occupying very little space in the cushion unit thus providing the unobstructed space or recess 40 to accommodate the feet of the person located rearwardly of the cushion C. By using inverted cone type springs 24 in the rearwardly disposed row of springs adjacent the space 40, it is possible to obtain the maximum space at the location where it is most needed.

Figs. 5 and 6 show a modified form of the invention which is similar to the Fig. 1 to 4 form in many respects. All similar parts in the two cushion constructions bear the same reference numerals. The lower border frame 10 of Figs. 5 and 6 is similar to the lower border frame 10 of Fig. 1 except for the free ends 14' of the side frame elements 12 and 13 which free ends 14' do not support leg elements 15. In Figs. 5 and 6 the rearwardly disposed, intermediate border frame element 16 is completely omitted. In this form of the invention the rear side of the upper border frame 30 has the upper free ends of the arched, flat, sinuously shaped, spring strips 51 connected thereto by the plate-type clips 52. The lower free ends of the strips 51 are pivotally anchored to the lower border frame rear side element 18 by a clipped or punched connection 53 that may be similar to the connection 47, 48 for the ends of hinge legs 46 of spring strips 41. It will be noted that spring strips 51 are located between the rear row of cone-type coil springs 24 so that the lower ends of strips 51 may be easily connected to the lower frame member 18. The rear portion of the cushion unit C' shown in Figs. 5 and 6 does not have the same amount of resilient supporting surface as the cushion C shown in Figs. 1–4 but due to the rear edge of cushion C' being usually located beneath the lower edge of a back cushion unit, the cushion construction C' has been found to be quite satisfactory and economical as well as providing the toe and leg space 50 that is so necessary in currently designed motor vehicles. Spring strips 51 act both as upper border frame stabilizing elements and spring supports thus they provide a dual function.

Each of the cushion units C and C' may have its upper and side surfaces covered with a sheet of burlap or the like 61 on which is placed a padding 62 of cotton, kapok, sisal or the like. Above the padding 62 another resilient padding 63 of sponge or cellular rubber or the like may be mounted. The exposed surfaces and the cushion units are then covered with an outer fabric 64 in conventional manner.

I claim:

1. A spring unit including in combination a substantially rectangular lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, a substantially rectangular upper border frame connected to the upper coils of the border coil spring elements located along the front side and the end edges of the spring unit, the rear side of said upper border frame being spaced rearwardly of the border coil spring elements located adjacent the rear side of the lower border frame so as to define a rearwardly opening recess along the rear side of the spring unit, and tie means including sinuously shaped spring strips mounted on the upper border frame and connecting the upper border frame to the lower border frame along the rear side of the spring unit, said spring strips bridging at least in part the recess along the rear side of the spring unit.

2. A spring unit including in combination a lower border frame comprising oppositely arranged, connected, side and end frame elements, spaced braces extending between oppositely arranged frame elements of said lower border frame, vertically extending coil spring elements mounted on certain of said braces, an upper border frame connected to the upper coils of the border coil spring elements located along the front side and the end edges of the spring unit, the rear side of said upper border frame being spaced rearwardly of the border coil spring elements adjacent the rear side of the lower border-frame to define a rearwardly opening recess along the rear side of the spring unit, an intermediate border frame member supported by the lower border frame and arranged to extend along the upper portion of the recess along the rear side of the spring unit intermediate the upper and lower coils of the coil spring elements, spring strip elements mounted on and extending between the rear side of the upper border frame and the upper coils of the coil spring elements located adjacent the rear side of the spring unit so as to bridge the recess along the rear side of the spring unit, and spring elements connected between the rear side of the upper border frame and the intermediate border frame member to resist and control relative movement therebetween.

3. A spring unit including in combination a substantially rectangular lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, resilient means connecting the upper coils of the coil spring elements, a substantially rectangular upper border frame connected to the upper coils of the border coil spring elements located along the front side and the end edges of the spring unit, the rear side of said upper border frame projecting rearwardly of the coil spring elements adjacent the rear side of the lower border frame to define a rearwardly opening recess therebeneath along the rear side of the spring unit, an intermediate border frame member supported by the rearwardly disposed ends of the lower border frame end elements and arranged to extend along the rear side of the spring unit intermediate the upper and lower coils of the coil spring elements, and sinuously shaped spring strips mounted on and extending between the rear side of the upper border frame and the upper coils of the coil spring elements located adjacent the rear side of the spring unit so as to bridge the recess along the rear side of the spring unit, said spring strips having portions thereof connected to the intermediate border frame to provide a resilient support for the rear side of the upper border frame.

4. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, an upper border frame connected to the upper coils of the border coil spring elements located along the front side and the end edges of the spring unit, the rear side of said upper border frame being spaced rearwardly of the border coil spring elements located adjacent the rear side of the lower border frame so as to define a rearwardly opening recess along the rear side of the spring unit, tie means including sinuously shaped spring strips connected between the upper and lower border frames along the rear side of the spring unit, said spring strips bridging at least a portion of the recess along the rear side of the spring unit, and pivotally mounted, rigid, stabilizing members connected between the upper and lower border frames to control relative movement therebetween.

5. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, the coil springs along the rear side of the lower border frame being of inverted conical shape, an upper border frame connected to the upper coils of the border coil spring elements located along the front side and the end edges of the spring unit, the rear side of said upper border frame being spaced rearwardly of the coil spring elements adjacent the rear side of the lower border frame so as to define a recess along the rear side of the spring unit, an intermediate border frame member supported by the rearwardly disposed ends of the lower border frame end elements and arranged to extend along the rear side of the spring unit intermediate the upper and lower coils of the coil spring elements, sinuously shaped spring strips mounted on and extending between the rear side of the upper border frame and the upper coils of the coil spring elements located adjacent the rear side of the spring unit so as to bridge the recess along the rear side of the spring unit and resilient means supported between the intermediate border frame member and the rear side of the upper border frame member.

6. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, an upper border frame connected to the upper coils of the border coil spring elements located along the front side and the end edges of the spring unit, the rear side of said upper border frame being spaced rearwardly of the coil spring elements adjacent the rear side at the lower border frame so as to define a rearwardly opening recessed space in the rear side of the spring unit, an intermediate border frame member of channel-shaped cross section supported by vertically extending legs projecting from the rearwardly disposed ends of the lower border frame and elements, said intermedate border frame element being arranged to extend along the rear side of the spring unit intermediate the upper and lower coils of the coil spring elements, and sinuously shaped spring strips having spaced apart straight leg portions fixedly mounted on the upper coils of the border coil spring elements located adjacent the rear side of the spring unit, and other spaced portions of the spring strips being connected to the rear side of the upper border frame so that said spring strips bridge the rearwardly opening space at the rear side of the spring unit.

7. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, an upper border frame connected to the upper coils of the border coil spring elements located along the front side and the end edges of the spring unit, the rear side of said upper border frame being spaced rearwardly of the coil spring elements adjacent the rear side at the lower border frame so as to define a rearwardly opening recessed space in the rear side of the spring unit, an intermediate border frame member of channel-shaped cross section supported by vertically extending legs projecting from the rearwardly disposed ends of the lower border frame and elements, said intermediate border frame element being arranged to extend along the rear side of the spring unit intermediate the upper and lower coils of the coil spring elements, and sinuously shaped spring strips having spaced apart straight leg portions fixedly mounted on the upper coils of the border coil spring elements located adjacent the rear side of the spring unit, other spaced portions of the spring strips being connected to the rear side of the upper border frame so that said spring strips bridge the rearwardly opening space at the rear side of the spring unit, and resilient means connected between the intermediate border frame member and the rear side of the upper border frame resisting relative movement therebetween.

8. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, an upper border frame connected to the upper coils of the border coil spring elements located along the front side and the end edges of the spring unit, the rear side of said upper border frame being spaced rearwardly of the coil spring elements adjacent the rear side at the lower border frame so as to define a rearwardly opening recessed space in the rear side of the spring unit, an intermediate border frame member of channel-shaped cross section supported by vertically extending legs projecting from the rearwardly disposed ends of the lower border frame and elements, said intermediate border frame element being arranged to extend along the rear side of the spring unit intermediate the upper and lower coils of the coil spring elements, and sinuously shaped spring strips having spaced apart straight leg portions strips having spaced apart straight leg portions fixedly mounted on the upper coils of the border coil spring elements located adjacent the rear side of the spring unit, other spaced portions of the spring strips being connected to the rear side of the upper border frame so that said spring strips bridge the rearwardly opening space at the rear side of the spring unit, said resilient means having portions thereof pivotally mounted in perforated openings in said intermediate border frame member and other portions anchored to the rear side of said upper border frame.

9. A spring unit including in combination a lower border frame comprising oppositely arranged, connected, side and end frame elements, spaced braces extending between oppositely arranged frame elements of said lower border frame, vertically extending coil spring elements mounted on certain of said braces, an upper border frame connected to the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and concavely arched, forwardly extending, sinuously shaped, spring strips connected between the rear side of the upper border frame and the rear side frame element of the lower border frame element, said spring strip being adapted to resist relative movement between said upper and lower border frames and to bridge the rearwardly opening recess in the rear side of the spring unit.

10. A spring unit including in combination a lower border frame comprising oppositely arranged, connected, side and end frame elements, spaced braces extending between oppositely arranged frame elements of said lower border frame, vertically extending coil spring elements mounted on certain of said braces, an upper border frame connected to the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and concavely arched, forwardly extending, sinuously shaped, spring strips connected between the rear side of the upper border frame and the lower border frame, said spring strip being adapted to resist relative movement between said upper and lower border frames and to bridge the rearwardly opening recess in the rear side of the spring unit.

11. A spring unit including in combination a lower border frame comprising oppositely arranged, connected, side and end frame elements disposed so as to have the rear side frame elements thereof positioned forwardly of the rear edge of the spring unit, spaced braces extending between oppositely arranged frame elements of said lower border frame, vertically extending coil spring elements mounted in spaced relation on certain of said braces, resilient connector elements extending between the upper coils of the coil spring elements, an upper border frame connected to the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and concavely arched rearwardly opening, sinuously shaped, spring elements connected between the rear side frame element of the upper border frame and the rear side frame element of the lower border frame so as to resist relative movement between said border frame elements, said latter spring elements bridging the aforementioned recess along the rear side of the spring unit.

12. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, vertically extending coil spring elements mounted in spaced relation on certain of said braces, resilient connector elements extending between the upper coils of the coil spring elements, an upper border frame connected to the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and concavely arched rearwardly opening, sinuously shaped, spring elements connected between the rear side frame element of the upper border frame and the rear side frame element of the lower border frame so as to resist relative movement between said border frame elements, said latter spring elements bridging the aforementioned recess along the rear side of the spring unit, said sinuously shaped spring elements being arranged along the rear side of the spring unit so that they extend between the spaced coil spring elements adjacent the rear side of the spring unit.

13. A spring unit including in combination a lower border frame comprising oppositely arranged, connected, side and end frame elements disposed so as to have the rear side frame elements thereof positioned forwardly of the rear edge of the spring unit, spaced braces extending between oppositely arranged frame elements of said lower border frame, vertically extending coil spring elements mounted in spaced relation on certain of said braces, resilient connector elements extending between the upper coils of the coil spring elements, an upper border frame connected to the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and spring elements connected between the rear side frame element of the upper border frame and the rear side frame element of the lower border frame so as to resist relative movement between said border frame elements, said latter spring elements bridging the aforementioned recess along the rear side of the spring unit.

14. A spring unit including in combination a lower border frame comprising oppositely arranged, connected, side and end frame elements disposed so as to have the rear side frame elements thereof positioned forwardly of the rear edge of the spring unit, spaced braces extending between oppositely arranged frame elements of said lower border frame, vertically extending coil spring elements mounted in spaced relation on certain of said braces, the coil spring elements adjacent the rear side of the spring unit being of inverted, conical type, resilient connector elements extending between the upper coils of the border coil spring elements located along the front side and the end edges of the spring unit, the rear side of said upper border frame being spaced rearwardly of the coil spring elements located adjacent the rear side of the spring unit so as to define a rearwardly opening recess in the rear side of the spring unit, and concavely arched rearwardly opening, sinuously shaped, spring elements connected between the rear side frame element of the upper border frame and the rear side frame element of the lower border frame so as to resist relative movement between said border frame elements, said latter spring elements bridging the aforementioned recess along the rear side of the spring unit.

15. A spring unit including in combination a lower border frame comprising oppositely arranged, connected, side and end frame elements, braces extending between oppositely arranged frame elements of said lower border frame, vertically extending coil spring elements mounted on certain of said braces, an upper border frame directly connected to the upper coils of the border coil spring elements along the front side and the end edges of the spring unit, the rear side of said upper border frame being spaced rearwardly of the coil spring elements positioned adjacent the rear side of the spring unit so as to define a rearwardly opening recess along the rear side of the spring unit, and tie means extending across said recess connected between the upper border frame and the lower border frame, said tie means including a resilient portion to permit some relative movement therebetween.

16. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, resilient means connecting the upper coils of the coil spring elements, an upper border frame connected to the upper coils of the border coil spring elements located along the front side and the end edges of the spring unit, the rear side of said upper border frame projecting rearwardly of the coil spring elements adjacent the rear side of the spring unit to define a rearwardly opening recess therebeneath along the rear side of the spring unit, an intermediate border frame member supported by the rearwardly disposed ends of the lower border frame end elements and arranged to extend along the rear side of the spring unit intermediate the upper and lower coils of the coil spring elements, and sinuously shaped spring strips mounted on and extending between the rear side of the upper border frame and the upper coils of the coil spring elements located adjacent the rear side of the spring unit so as to bridge the recess along the rear side of the spring unit, said sinuously shaped spring strips including a substantially V-shaped hinging portion extending between and connected to the rear side of the upper border frame and the intermediate border frame member.

17. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, resilient means connecting the upper coils of the coil spring elements, an upper border frame connected to the upper coils of the border coil spring elements located along the front side and the end edges of the spring unit, the rear side of said upper border frame projecting rearwardly of the coil spring elements adjacent the rear side of the spring unit to define a rearwardly opening recess therebeneath along the rear side of the spring unit, an intermediate border frame member supported by the rearwardly disposed ends of the lower border frame end elements and arranged to extend along the rear side of the spring unit intermediate the upper and lower coils of the coil spring elements, and sinuously shaped spring strips mounted on and extending between the rear side of the upper border frame and the upper coils of the coil spring elements located adjacent the rear side of the spring unit so as to bridge the recess along the rear side of the spring unit, said sinuously shaped spring strips including a substantially V-shaped hinging portion extending between and connected to the rear side of the upper border frame and the intermediate border frame member, the substantially V-shaped spring hinging portions being arranged with the legs thereof converging toward the front side of the spring unit and being located in the upper portion of the space between the rear side of the spring unit and the coil spring elements along the rear side of the spring unit.

18. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, resilient means connecting the upper coils of the coil spring elements, an upper border frame connected to the upper coils of the border coil spring elements located along the front side and the end edges of the spring unit, the rear side of said upper border frame projecting rearwardly of the coil spring elements adjacent the rear side of the spring unit to define a rearwardly opening recess therebeneath along the rear side of the spring unit, an intermediate border frame member supported by the rearwardly disposed ends of the lower border frame and elements and arranged to extend along the rear side of the spring unit intermediate the upper and lower coils of the coil spring elements, sinuously shaped spring strips mounted on and extending between the rear side of the upper border frame and the upper coils of the coil spring elements located adjacent the rear side of the spring unit so as to bridge the recess along the rear side of the spring unit, said sinuously shaped spring strips including a substantially V-shaped spring hinging portion extending between and connected to the rear side of the upper border frame and the intermediate border frame member, the substantially V-shaped spring hinging portions being arranged with the legs thereof converging towards the front side of the spring unit and being located in the upper portion of the space between the rear side of the spring unit and the coil spring elements along the rear side of the spring unit, and brace means connected between the rear side of the lower border frame and the intermediate border frame.

19. A spring unit including in combination a lower border frame comprising oppositely arranged, connected, side and end frame elements disposed so as to have the rear side frame element thereof positioned forwardly of the rear edge of the spring unit, spaced braces extending between oppositely arranged frame elements of said lower border frame, coil spring elements mounted in spaced relation on certain of said braces, resilient means connecting the upper coils of the coil spring elements, an upper border frame connected to the upper coils of the border coil spring elements located along the front side and the end edges of the spring unit, the rear side of said upper border frame projecting rearwardly of the coil spring elements adjacent the rear side of the spring unit to define a rearwardly opening recess therebeneath along the rear side of the spring unit, an intermediate border frame member supported by the rearwardly disposed ends of the lower border frame end elements and arranged to extend along the rear side of the spring unit intermediate the upper and lower coils of the coil spring elements, sinuously shaped spring strips mounted on and extending between the rear side of the upper border frame and the upper coils of the coil spring elements located adjacent the rear side of the spring unit so as to bridge the recess along the rear side of the spring unit, said sinuously shaped spring strips including a substantially V-shaped hinging portion extending between and connected to the rear side of the upper border frame and the intermediate border frame member, the substantially V-shaped spring hinging portions being arranged with the legs thereof converging towards the front side of the spring unit and being located in the upper portion of the space between the rear side of the spring unit and the coil spring elements along the rear side of the spring unit, brace means connected between the rear side of the lower border frame and the intermediate border frame, and upper border frame stabilizing members pivotally connected between the upper border frame and a lower border frame to resist relative movement therebetween.

20. In a spring cushion assembly, a base frame having front and side portions and a rear portion elevated above said front and side portions, rows of coil springs supported on the base frame forwardly of the elevated portion, and zigzag spring strips extending from the top portion of the rearmost row of coil springs to the rear elevated frame portion.

21. A spring assembly having a base with the rear portion thereof offset upwardly and rearwardly to provide a free space, coil springs mounted on the base on the central and forward portions thereof, and zigzag spring strips bridging the space between the upwardly offset rear portion of the frame and the top portion of the rearmost row of coil springs.

22. In a spring cushion asembly, a base frame having front and side portions and a rear portion elevated above said front and side portions, rows of coil springs supported on the base frame forwardly of the elevated portion, and zigzag spring strips extending from the top portions of the rearmost row of coil springs to the rear elevated frame portion.

23. In a spring cushion assembly, a base frame having a central and forward portion for supporting coil springs and a portion rearwardly thereof elevated above said first portion, coil springs mounted on the base in the central and forward portions thereof, and zigzag spring strips having a V-shaped end portion secured between the rearmost coil springs and the rear elevated frame portion.

24. In a spring cushion assembly, a base frame having a central and forward portion for supporting coil springs and a portion rearwardly thereof elevated above said first portion, coil springs mounted on the base in the central and forward portions thereof, zigzag spring strips having a V-shaped end portion secured between the rearmost coil springs and the rear elevated frame portion, and a border wire extending around said coil spring and said spring strips at the top of the V-shaped end portions thereof.

25. In a spring cushion assembly, a base frame having a central and forward portion for supporting coil springs and a portion rearwardly thereof elevated above said first portion, coil springs mounted on the base in the central and forward portions thereof, zigzag spring strips having a V-shaped end portion secured between the rearmost coil springs and the rear elevated frame portion, a border wire extending around said coil springs and said spring strips at the top of the V-shaped end portions thereof, and brace wires extending from the forward portion of said border wire rearwardly and downwardly to the rear portion of the central base portion.

26. A spring assembly having a base with the rear portion thereof offset upwardly and rearwardly to provide a free space therebelow, coil springs mounted on the base on the the central and forward portions thereof, zigzag spring strips bridging the upwardly offset rear portion of the frame and the rearmost row of coil springs, springs interconnecting the top coil of said coil springs, and a resilient strip interconnecting said zigzag spring strips.

27. In a spring cushion assembly, a base frame having a central and forward portion for supporting coil springs and a portion rearwardly thereof elevated above said first portion, coil springs mounted on the base in the central and forward portions thereof, zigzag spring strips having a V-shaped end portion secured between the rearmost coil springs and the rear elevated frame portion, springs interconnecting the top coil of said coil springs, and a resilient strip interconnecting said zigzag spring strips.

References Cited in the file of this patent

UNITED STATES PATENTS

| Number | Name | Date |
|---|---|---|
| 216,634 | Underwood | June 17, 1879 |
| 823,427 | Mellon | June 12, 1906 |
| 1,164,534 | Lewis | Dec. 14, 1915 |
| 1,846,848 | Costigan | Feb. 23, 1932 |
| 2,002,157 | Reed | May 21, 1935 |
| 2,012,575 | McInerney | Aug. 27, 1935 |
| 2,059,424 | Wesley | Nov. 3, 1936 |
| 2,186,548 | Lotz | Jan. 9, 1940 |
| 2,291,429 | Wolfe | July 28, 1942 |
| 2,315,543 | Pilero et al. | Apr. 6, 1943 |
| 2,315,706 | Hopkes | Apr. 6, 1943 |
| 2,526,184 | Williams et al. | Oct. 17, 1950 |
| 2,613,732 | Dye et al. | Oct. 14, 1952 |

FOREIGN PATENTS

| Number | Country | Date |
|---|---|---|
| 360,615 | Great Britain | Nov. 12, 1931 |
| 587,828 | Great Britain | May 7, 1947 |